United States Patent [19]

Sugimoto et al.

[11] Patent Number: 4,929,060
[45] Date of Patent: May 29, 1990

[54] COLOR LIQUID CRYSTAL DISPLAY DEVICE

[75] Inventors: Naoshige Sugimoto, Hino; Tetsushi Yoshida, Hachioji; Tadahisa Toyama, Fussa, all of Japan

[73] Assignee: Casio Computer Co., Ltd., Tokyo, Japan

[21] Appl. No.: 190,100

[22] Filed: May 4, 1988

[30] Foreign Application Priority Data

May 6, 1987 [JP] Japan ............................ 62-66760[U]
Apr. 28, 1988 [JP] Japan ................. 63-106539

[51] Int. Cl.$^5$ ............................................ G02F 1/133
[52] U.S. Cl. ..................... 350/339 F; 350/339 R
[58] Field of Search ..................... 350/339 F, 339 R

[56] References Cited

U.S. PATENT DOCUMENTS

| | | |
|---|---|---|
| 3,914,464 | 10/1975 | Thomasson et al. |
| 4,339,514 | 7/1982 | Biber . |
| 4,561,725 | 12/1985 | Hotta ................................. 350/341 |
| 4,579,424 | 4/1986 | Matsukawa et al. ................ 350/336 |
| 4,593,977 | 6/1986 | Takamatsu et al. ............ 350/339 F |
| 4,597,637 | 7/1986 | Ohta ............................. 350/339 F |
| 4,632,514 | 12/1986 | Ogawa et al. ................. 350/339 F |
| 4,673,253 | 6/1987 | Tanabe et al. ................. 350/339 F |
| 4,779,957 | 10/1988 | Suginoya et al. .............. 350/339 F |
| 4,793,692 | 12/1988 | Kamio et al. ..................... 350/349 |
| 4,802,743 | 2/1989 | Takao et al. .................. 350/339 F |

FOREIGN PATENT DOCUMENTS

| | | |
|---|---|---|
| 58-46325 | 3/1983 | Japan . |
| 58-46326 | 3/1983 | Japan . |
| 58-102214 | 6/1983 | Japan . |
| 59-136718 | 8/1984 | Japan . |
| 59-137931 | 8/1984 | Japan . |
| 59-146024 | 8/1984 | Japan . |
| 59-148029 | 8/1984 | Japan . |
| 60-23827 | 2/1985 | Japan . |
| 60-73524 | 4/1985 | Japan . |
| 60-79331 | 5/1985 | Japan . |
| 60-159823 | 8/1985 | Japan . |
| 60-159824 | 8/1985 | Japan . |
| 60-159827 | 8/1985 | Japan . |
| 60-159830 | 8/1985 | Japan . |
| 60-159831 | 8/1985 | Japan . |
| 60-217337 | 10/1985 | Japan . |
| 61-43727 | 3/1986 | Japan . |
| 61-46931 | 3/1986 | Japan . |
| 61-51126 | 3/1986 | Japan . |
| 61-51127 | 3/1986 | Japan . |
| 61-75304 | 4/1986 | Japan . |
| 61-98330 | 5/1986 | Japan . |
| 61-121033 | 6/1986 | Japan . |
| 62-148926 | 7/1987 | Japan . |
| 2111285 | 6/1983 | United Kingdom . |

OTHER PUBLICATIONS

IEEE Transactions on Electron Devices, vol. ED-30, No. 5, May 1983, "A Full-Color Matrix Liquid-Crystal Display with Color Layers on the Electrodes", by Uchida et al.

Primary Examiner—Stanley D. Miller
Assistant Examiner—Anita Pellman Gross
Attorney, Agent, or Firm—Frishauf, Holtz, Goodman & Woodward

[57] ABSTRACT

A color liquid crystal display includes a color filter for passing light of a specific wavelength formed between one of the inner surfaces of a pair of substrates which face each other. On the color filter is formed a protective film having a double-layered structure of a transparent first insulative film made of an organic material and a transparent second insulative film made of an inorganic material. On the protective film are sequentially formed transparent electrodes made of ITO and an aligning film. Transparent electrodes and an aligning film are also sequentially formed on the other inner surface of the paired substrates. The substrates are joined by a seal mmeber and a pair of polarizing plates are disposed outside of the joined substrates.

20 Claims, 12 Drawing Sheets

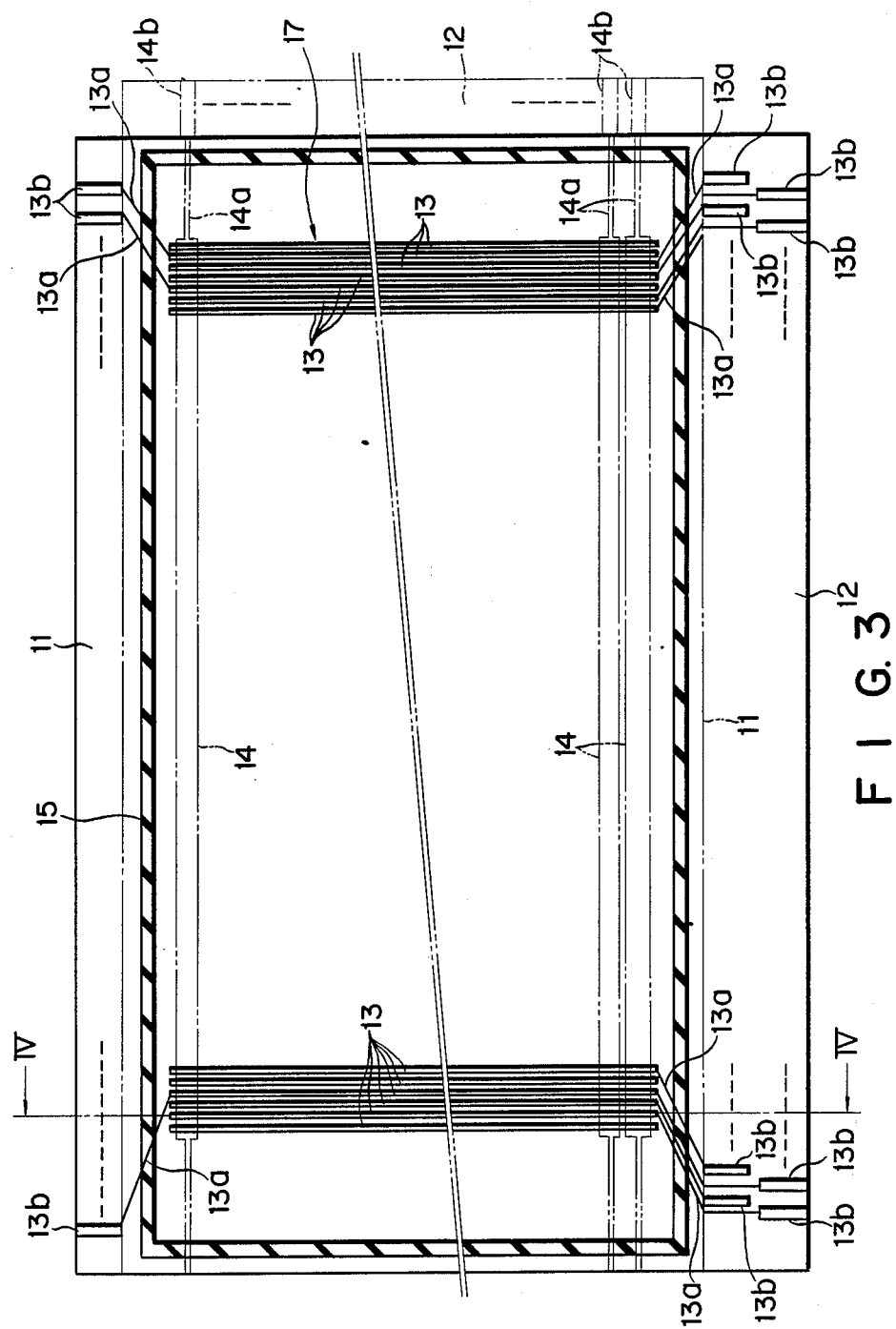

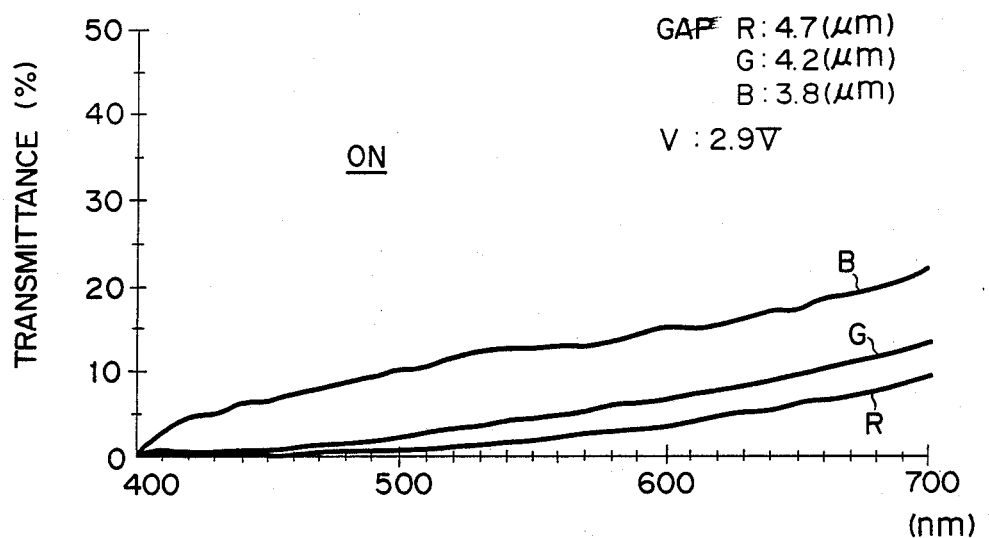
F I G. 10
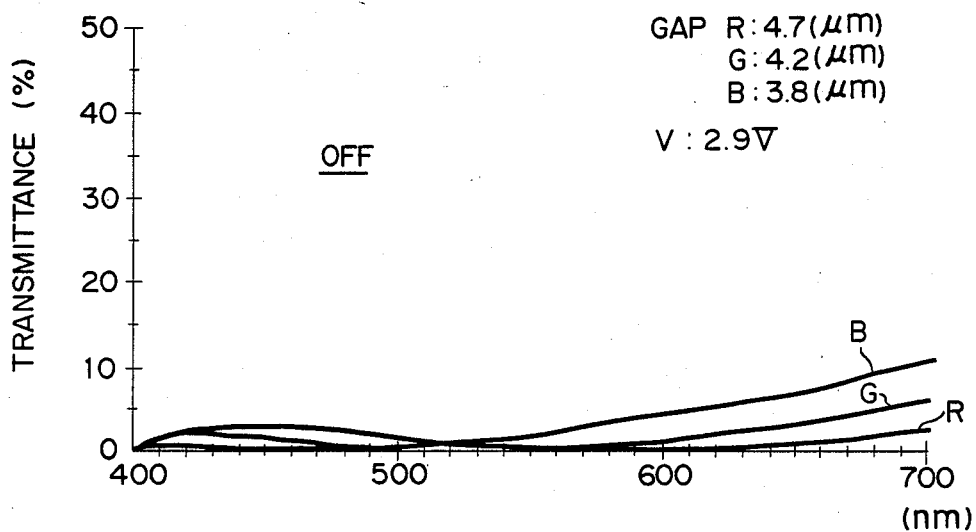
F I G. 11

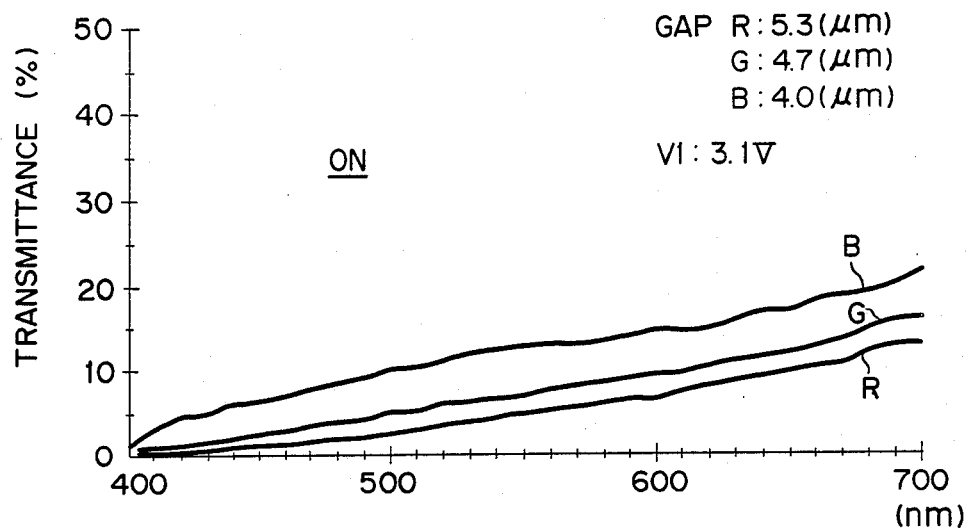
F I G. 12
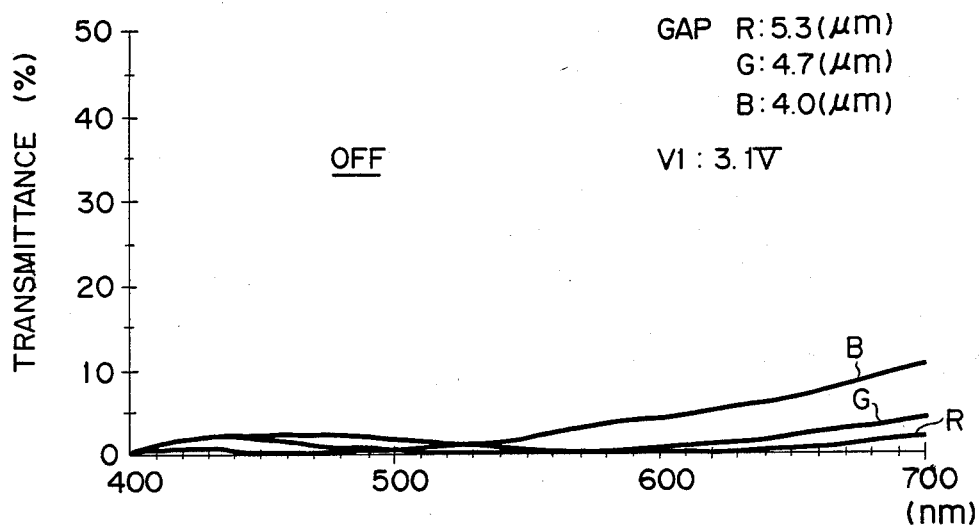
F I G. 13

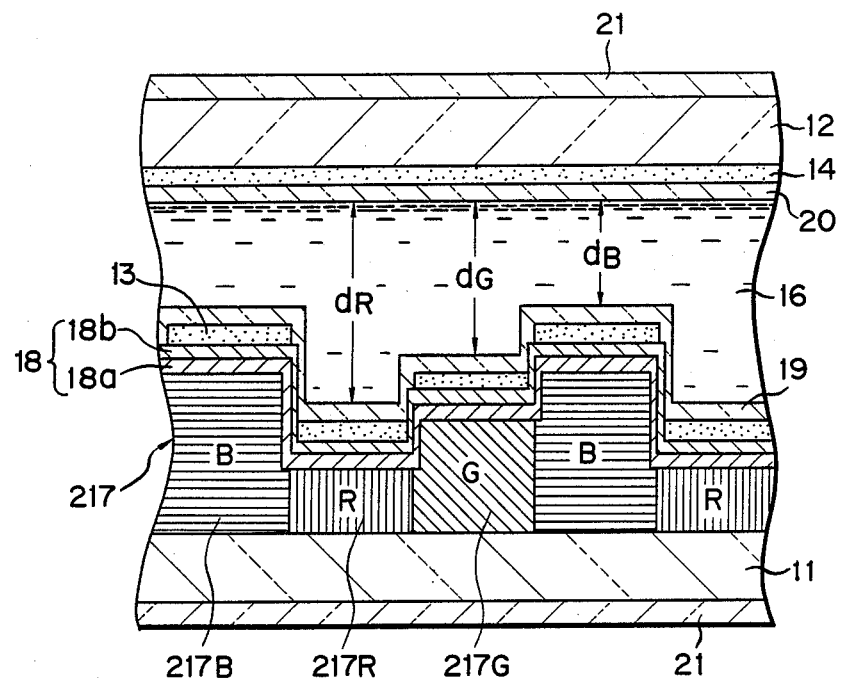
F I G. 17

COLOR LIQUID CRYSTAL DISPLAY DEVICE

BACKGROUND OF THE INVENTION

1. Field of the Invention

The present invention relates to a color liquid crystal display device with a color filter for the primary colors.

2. Description of the Related Art

Color liquid crystal display devices are used for displaying a television picture image. This type of display device comprises two substrates, one having a plurality of transparent scanning electrodes formed thereon and the other having a plurality of signal electrodes formed thereon and facing the scanning electrodes, a liquid crystal provided between these substrates, a pair of polarizing plates disposed outside the substrates and a color filter colored in the primary colors of red, green and blue in association with the scanning electrodes. Each cross point between the scanning and signal electrodes constitutes a pixel and three adjacent pixels constitute a single element for a color image.

The color filter for use in the above display device is formed on the transparent signal electrodes formed on the second substrate. This color filter is formed by coloring a staining base material, made of a protein such as casein or gelatin, with a dye. The base material of the color filter is a dielectric and the liquid crystal is disposed between the color filter and the scanning electrodes. Therefore, the liquid crystal is applied only with a voltage which is attained by dividing the voltage applied between the signal and scanning electrodes in accordance with the dielectric constants of the color filter (dielectric) and the liquid crystal. Accordingly, the conventional color liquid crystal display device uses a liquid crystal with a low response characteristic or requires a high driving voltage.

To solve the above problem, there has been proposed a color liquid crystal display device which has electrodes formed on the color filter so that the liquid crystal can be applied with substantially the same voltage as applied between facing electrodes. The structure of such color liquid crystal display is disclosed in Japanese Patent Disclosure No. 60-159830, 60-159823 and 61-51126. According to the disclosed structure, a transparent conductive film is formed directly on a color filter. With this structure, however, a conductive inorganic material such as Indium-Tin-Oxide (hereinafter referred to as ITO) is formed on a color filter made of a colored organic material such as casein or gelatin, thus impairing the adhesiveness between the color filter and the conductive film. In addition, as the inorganic conductive film is formed by means of, for example, sputtering so that the surface temperature of the color filter is increased. This makes it difficult to form the transparent conductive film made of ITO or the like which has an excellent characteristic.

The solution to this problem is proposed which first forms a transparent insulative film on a color filter and then forms transparent electrodes thereon as disclosed in Japanese Patent Disclosure No. 61-43727. A similar structure is disclosed in Japanese Patent Disclosure No. 60-159831 in which a transparent insulative film made of an organic material such as an acrylic resin is formed on a color filter and transparent electrodes made of ITO is then formed on the insulative film. Since the transparent insulative film made of the aforementioned organic material has a low acid resistance and has a water absorption, however, the color filter disposed below the insulative film is likely to be damaged by acid etching liquid and the dye in the color filter may leak out in the patterning or the like of the ITO conductive film formed on the insulative film. The color filter for use in the conventional color liquid crystal display device is therefore difficult to produce with a good characteristic.

Further, the color liquid crystal device requires a good color balance. With a color liquid crystal display device with pair of polarizing plates having their polarizing axes arranged in parallel to each other, however, if pixels of the individual colors are driven by the same voltage, the transmissivities of lights passing through the pixels of three different colors would differ from one another. This is because the optical anisotropy ($\Delta n$) for the lights of individual wavelengths differ from one another and the transmissivities is determined by $\Delta n$ multiplied by the thickness of the liquid crystal layer, d, i.e., $\Delta n \cdot d$. Consequently, the light passing through the liquid crystal device appears to be colored. That is, due to different transmissivities of lights of the different wavelengths which are to pass through the associated color filters, the entire screen of the display device appears to be in a specific color. For instance, according to a color liquid crystal display device of a simple matrix type, the transmissivities of red light is high, so that the entire screen looks reddish or provides a sepia color.

According to an active matrix type liquid crystal display device which has a active element such as a thin film transistor (TFT) coupled to each display electrode constituting each pixel, the thickness of the liquid crystal layer is varied for those portions of the color filter which correspond to the color filter colors in order to prevent the color imbalance. This structure is disclosed in, for example, Japanese Patent Disclosure No. 60-159823 60-159830 60-159827, 60-159831 61-98330 and 61-121033. The liquid crystal display device disclosed in these documents have different thicknesses for those corresponding to the R, G and B filters. The layer thickness is set in such a manner that the values of $\Delta n \cdot d$ at those portions where the R, G and B filters are formed coincide with $\Delta n \cdot d$ at the points ($\alpha 1$, $\alpha 2$, $\alpha 3$) where the transmissivities represented by the transmissivity curves B, G and R of lights for the individual colors first indicate the minimum values, as shown in FIG. 1 which illustrates transmissivities with respect to $\Delta n \cdot d$ for lights passing though the individual R, G and B filters. According to the active matrix type liquid crystal display device, therefore, the color balance is improved by varying the thickness of the liquid crystal layer at those portions which correspond to the individual color filters for the following reason. According to the active matrix type liquid crystal display device, since the liquid crystal is applied with a substantially static voltage, each pixel is turned off and on respectively by a voltage Va which provides the darkest state in FIG. 2 that illustrates the transmissivities with respect to a voltage and a voltage Vb which provides the brightest state, and in the OFF state, the values of $\Delta n \cdot d$ for the orientation of liquid crystal molecules substantially equal those of $\Delta n \cdot d$ for the initial orientation of these molecules.

According to the simple matrix type liquid crystal display device having mutually-facing electrodes respectively formed on two substrates, however, the individual pixels are driven in a multiplex manner so that a bias voltage is also applied between facing electrodes of the pixels in the OFF state. That is in FIG. 2, voltage Va1 is applied between these electrodes in the OFF state while voltage Vb1 is applied in the ON state. Consequently, the orientation of the liquid crystal varies by the bias voltage so that unlike in the case of the active matrix type, the color balance cannot be acquired by setting $\Delta n \cdot d$ at the initial state equal to the values $\alpha 1$, $\alpha 2$ and $\alpha 3$ in FIG. 1 for the pixels associated with the individual colors. According to the conventional simple matrix type liquid crystal display device, it is difficult to control the color balance. In this respect, therefore, $\Delta n \cdot d$ is set in the range between $\beta 1$ and $\beta 2$ as shown in FIG. 1, i.e., 1.1 and 1.2, in consideration of a relatively low wavelength-dependency of the transmissivity and a high contrast for a large value of $\Delta n \cdot d$. Due to a relatively large value of $\Delta n \cdot d$, however, the conventional liquid crystal display device has a narrower viewing angle and cannot have the color balance sufficiently well controlled.

SUMMARY OF THE INVENTION

It is an object of this invention to provide a color liquid crystal display device which overcomes the aforementioned shortcomings, has a color filter with a stable characteristic, has a high response characteristic and provides an excellent color display.

To achieve the object, the color liquid crystal display device of this invention comprises:

first and second substrates facing each other;
a color filter formed on that surface of said first substrate which faces said second substrate;
a first insulative film formed over said color filter and made of a substantially transparent organic material;
a second insulative film formed over said first insulative film and made of a substantially transparent inorganic material;
a first electrode formed on said second insulative film and made of a substantially transparent conductive material;
a second electrode formed on that surface of said second substrate which faces said first substrate in such a manner as to face said first electrode and made of a conducive material;
a liquid crystal disposed between said first and second substrates; and
at least one polarizing means provided on at least one side of an exterior of said liquid crystal.

With the above structure, the color filter of this color liquid crystal display device formed on the inner surfaces of the facing substrates is covered with an organic insulative film, which has a high adhesiveness to the color filter and is easy to form, and an inorganic insulative film, which has high heat resistance and has no water absorption. This prevents the dye from leaking from the color filter and prevents the color filter from being damaged during the process of forming transparent electrodes. In addition, since the color filter, organic insulative film and inorganic insulative film have excellent adhesiveness to one another and are sequentially laminated, the color filter and transparent conductive films will not be separated from one another and have stable characteristics.

Furthermore, according to the present color liquid crystal display device, the liquid crystal layer is made to have different thicknesses at those portions corresponding to the individual color filter portions by varying the thickness of the color filter covered by the double-layered insulative film. The thicknesses of the liquid crystal layer are determined to substantially minimize the transmissivity to the light with the wavelength of each color when the bias voltage for driving the display device in a multiplex manner is applied between the facing electrodes. Accordingly, even the simple matrix type color liquid crystal display device when embodying this invention has a high color balance and improved visual characteristic by setting the liquid crystal layer to have specific thicknesses at those portions corresponding to the individual color filter portions.

BRIEF DESCRIPTION OF THE DRAWINGS

FIG. 3 is a plan view illustrating the first embodiment of this invention;

FIGS. 10 and 11 are diagrams of spectrum characteristics illustrating the transmissivities for the individual color lights in the ON and OFF states, respectively, with the thickness of the liquid crystal layer set according to the second embodiment;

FIGS. 12 and 13 are diagrams of spectrum characteristics illustrating the transmissivities for the individual color lights in the ON and OFF states, respectively, with the thickness of the liquid crystal layer set differently;

FIG. 17 is a partially cross section illustrating a modification of the second embodiment.

DETAILED DESCRIPTION OF THE PREFERRED EMBODIMENTS

A detailed explanation of this invention will now be given. According to this invention, a color filter for passing the light of a specific wavelength is formed on at least one of a pair of substrates facing each other with a liquid crystal in between and this color filter is covered with at least two layers, namely, the first transparent insulative film made of an organic material and the second transparent insulative film made of an inorganic material. Transparent electrodes made of ITO (Indium-Tin-Oxide) or the like are further formed on the double-layered insulative film. The color filter has a protein (such as gelatin or casein) film colored by a dye. The first insulative film is formed of an organic insulative material, such as an acrylic-base epoxy resin, a polyimide-base resin or a film coated with amino silane (TORE silicon SH6020) and then annealed, which has a high adhesiveness to the color filter, a high heat resistance and a high insulation and is easy to form. The second insulative film is formed of an inorganic insulative material such as $SiO_2$ or $TiO_2$, which has a high adhesiveness to the aforementioned organic high-molecular resin, a high heat resistance, a high acid resistance and a high alkali resistance and has no water absorption. The second $SiO_2$ insulative film can be formed by sputtering or coating an organic or inorganic silanol compound and then annealing it at a relatively low temperature. Since the organic insulative film and inorganic insulative film are sequentially laminated on the color filter so as to protect the color filter, the adhesivenesses between the layers are high. Further, since the inorganic insulative film which is exposed in etching of the ITO film formed on these insulative films has high acid and alkali resistances and has no water absorption, the color filter can be prevented from being damaged during the process of etching the ITO film. In contrast, with the use of only an organic insulative film as is in the prior art, the color filter is likely to be damaged during the ITO-etching process due to the water absorption of the organic insulative film. In addition, forming the organic insulative film on the color filter can flatten the roughness of the substrate caused by the provision of the color filter.

First Embodiment

Figure 4:
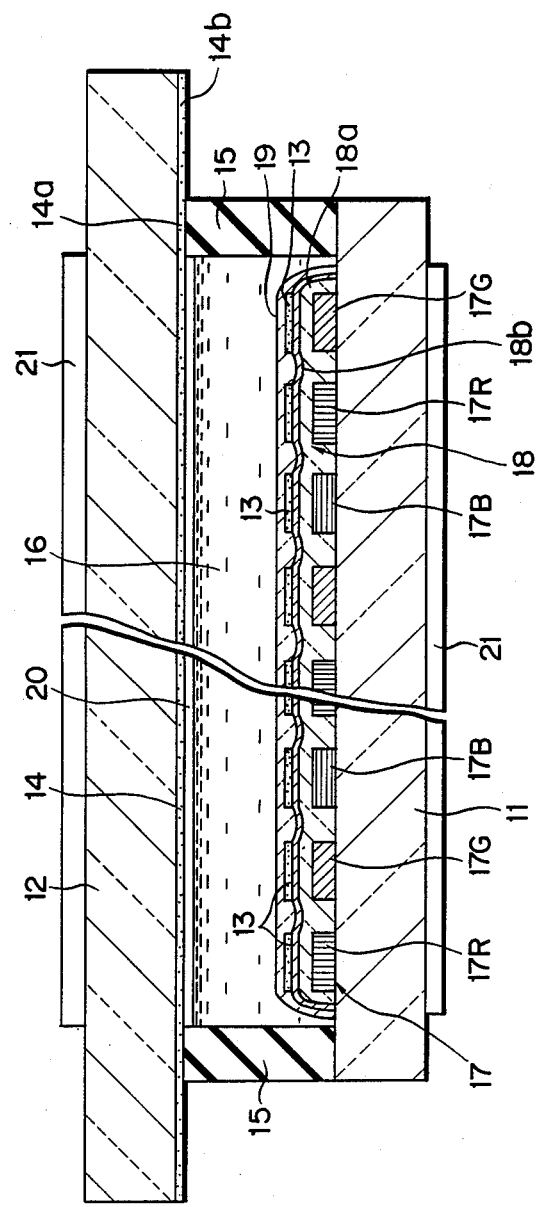
FIG. 4 is a cross section taken along the line VI—VI in FIG. 3.

An embodiment of this invention as applied to a simple matrix type color liquid crystal display device will be explained below referring to FIGS. 3 and 4.

A pair of transparent glass plates, a lower substrate 11 and an upper substrate 12, are disposed to face each other and are adhered to each other by means of a seal member 15 of a frame shape with a predetermined gap therebetween.

In a surface of lower substrate 11 is formed a color filter 17 which is colored in predetermined dyes after patterning the protein such as gelatin or casein. The color filter 17 comprises filters 17R, 17G and 17B which pass the lights of the wavelengths of red, green and blue, respectively. These filters 17R, 17G and 17B are repeatedly arranged to form the vertical stripes in FIG. 3. On color filter 17 is formed a transparent protective film 18 with a double-layer structure, which comprises a resin layer 18a adhered to color filter 17 and an insulative layer 18b that is not corroded by acid alkali or the like. Resin layer 18a is formed by spin-coating an acrylic-base epoxy resin (e.g., Japan Synthetic Rubber JSS-16) and then annealing it, while insulative layer 18b is formed by sputtering a silicon dioxide ($SiO_2$) On protective film 18 are a plurality of signal electrodes 13 formed vertically in association with the individual color filters 17R, 17G and 17B of color filter 17. These signal electrodes 13 are transparent and are made of ITO. The tops of signal electrodes 13 are covered with an orientation film 19 made of a polyimide resin.

A plurality of transparent scanning electrodes 14 made of ITO are formed on that surface of upper substrate 12 which faces lower substrate 11, in the horizontal direction perpendicular to signal electrodes 13 as shown in FIG. 3. The surfaces of scanning electrodes 14 are covered with an align film 20 made of polyimide resin. Each of align films 19 and 20 has its surface subjected to a rubbing process in a predetermined direction. A liquid crystal 16 is sealed in a region surrounded by align films 19 and 20 and seal member 15. Each electrode 13 and each electrode 14 have their lead sections 13a and 14a extending through seal member 15 to edge portions of the associated substrates 11 and 12 to be coupled to the associated electrode terminals 13b and 14b. A pair of polarizing plates 21 and 21 are disposed outside of lower substrate 11 and upper substrate 12 in such a manner that their polarizing axes are perpendicular or in parallel to each other.

According to the color liquid crystal display device with the above structure, a plurality of cross sections between a single scanning electrode 14 and three signal electrodes 13 corresponding to the individual color filters 17R, 17G and 17B constitute pixels for the individual colors and three pixels for the individual colors constitute a single element of a color image. These pixels are arranged in a matrix form. This display device is driven in a multiplex manner and provides a color display of a television picture image, etc. by controlling the tint and transmissivity intensity of the pixels.

The following explains the method for forming color filter 17, protective film 18, signal electrodes 13 and align film 19 on lower substrate 11.

First, an about 1 μm-thick film of protein such as gelatin or casein is formed on substrate 11 made of a transparent glass plate and is then subjected to a patterning process. The resultant structure is then colored with a desired dye and is subjected to a staining preventing process. These processes are repeated for each color filter, thereby providing a color filter having a number of R, G and B filters arranged in stripe.

Then, an acrylic-base epoxy resin (e.g., Japan Synthetic Rubber JSS-16) is spin-coated on substrate 11 to cover color filter 17 and is annealed, thereby forming resin layer 18a with a thickness of an about 0.3-0.4 μm. A silicon dioxide ($SiO_2$) is adhered on resin layer 18a by sputtering to form insulative layer 18b with a thickness of about 1500A. The resin layer 18a and insulative layer 18b constitute transparent protective film 18.

ITO is then sputtered on protective film 18 to provide a uniform film thickness and the resultant structure is subjected to an etching process. As a result, a number of signal electrodes 13 are formed on protective film 18 in association with the individual color filters 17R, 17G and 17B. A polyimide resin is coated on protective film 18 to cover signal electrodes 13, thus forming align film 19, whose surface is then rubbed in a predetermined direction.

According to the color liquid crystal display device of this invention, signal electrodes 13 are formed on color filter 17 through protective film 18 and a very thin align film 19 alone lies on signal electrodes 13, so that liquid crystal 16 sandwiched between signal electrodes 13 and scanning electrodes 14 is applied with a voltage substantially equal to the voltage applied between electrodes 13 and 14. This results in a high response characteristic of the liquid crystal and a high transmissivity intensity of light and provides a bright and clear picture image with a good color reproducibility. In particular, since protective film 18 provided between color filter 17 and signal electrodes 13 has a double-layer structure of organic insulative film 18a made of an acrylic-base epoxy resin or polyimide-base synthetic resin and inorganic insulative film 18b made of a silicon dioxide, color filter 17 is not corroded by acid, alkali or the like in forming signal electrodes 13 by etching ITO and can assuredly and well protected.

This invention is not limited to the aforementioned simple matrix type color liquid crystal display device but can be applied to other types of color liquid crystal display devices, such as an active matrix type.

Second Embodiment

Figure 5:
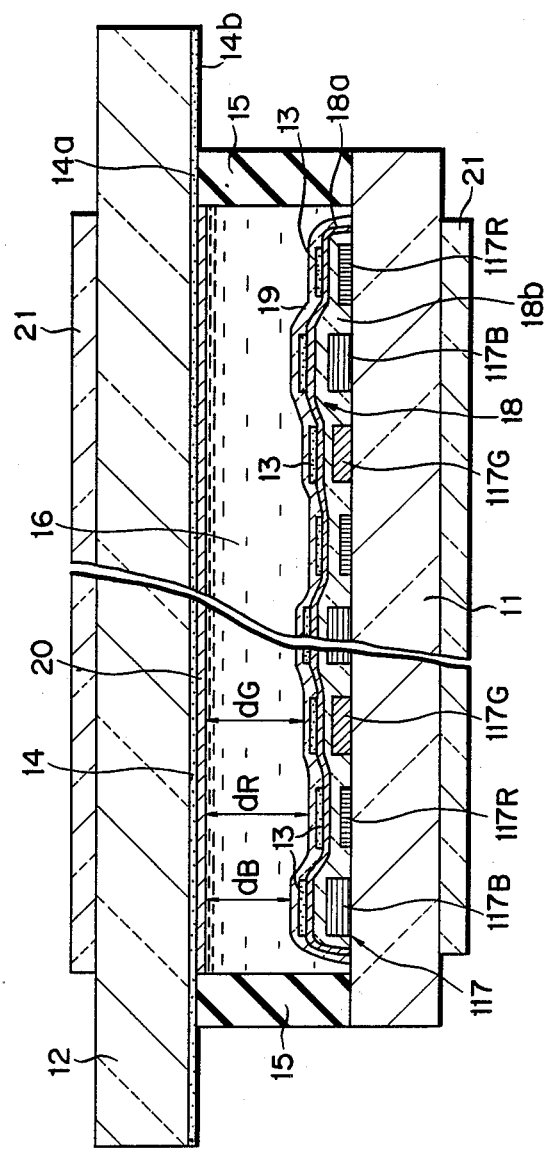
FIG. 5 is a cross section illustrating the second embodiment of this invention, as taken along the same line as the line VI—VI in FIG. 3 of the first embodiment.

Referring now to FIG. 5, the second embodiment of this invention as applied to the simple matrix type color liquid crystal display device will be explained. Since the upper and lower substrates, protective film and electrodes of the second embodiment have the same structures as those of the first embodiment, these components are denoted by the same reference numerals and their redundant explanation will be omitted here.

In FIG. 5, the display device is of a twisted nematic type and has a pair of polarizing plates 21 and 21 provided in such a way that their polarizing axes are in parallel to each other. According to the second embodiment, a plurality of pixels constituted by cross sections between signal electrodes 13 and scanning electrodes 14, which are formed in the same manner as are formed in the first embodiment, are driven in a multiplex manner. Color filters 117R, 117G and 117B of color filter 117 have thicknesses different from one another. The liquid crystal has different layer thicknesses $d_R$, $d_G$ and $d_B$ at those corresponding to filters 117R, 117G and 117B, respectively. These thicknesses $d_R$, $d_G$ and $d_B$ are set to substantially minimize the transmissivity of light with a wavelength for passing through each color filter when bias voltage for driving the pixels in a multiplex manner is applied to those portions of the liquid crystal which have different thicknesses.

A more detailed explanation of the thicknesses $d_R$, $d_G$ and $d_B$ of the liquid crystal layer will be given below.

Figure 1:
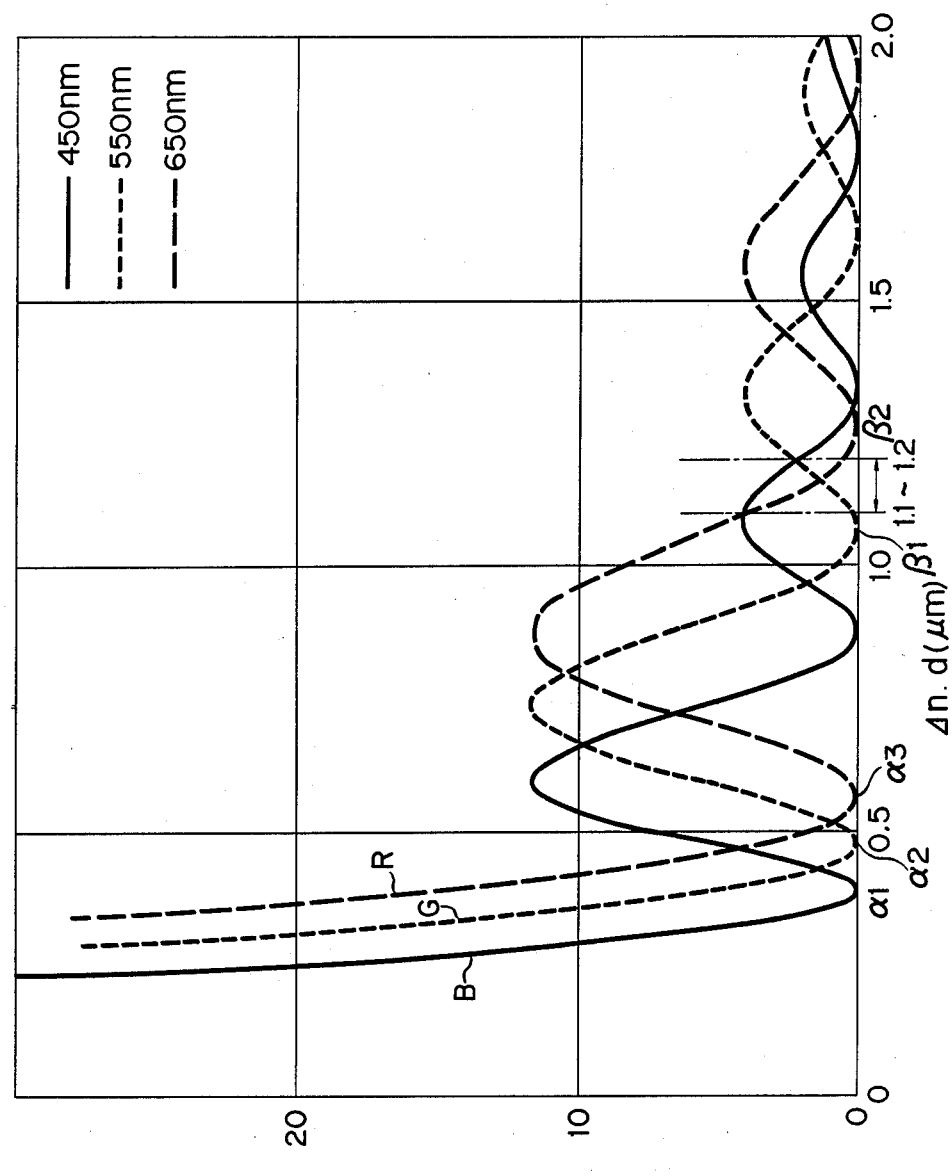
FIG. 1 is a diagram of a transmissivity characteristic illustrating the transmissivity of a liquid crystal display device with respect to values of $\Delta n \cdot d$ for lights of wavelengths of red, green and blue.
Figure 2:
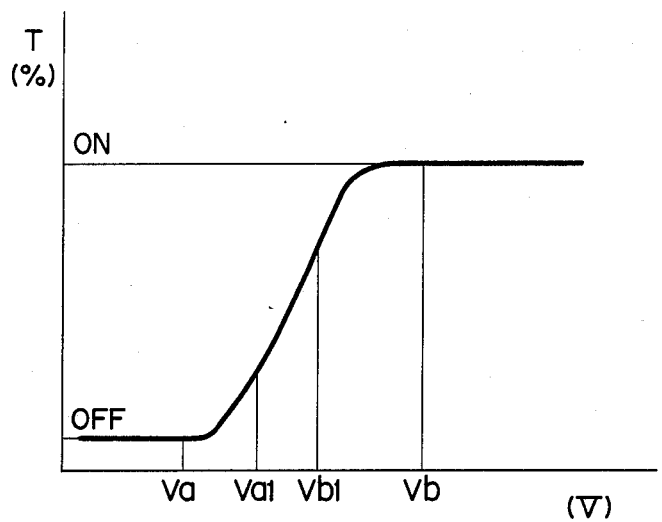
FIG. 2 is a diagram of the operational characteristic illustrating the transmissivity with respect to a voltage applied to a liquid crystal.
Figure 6:
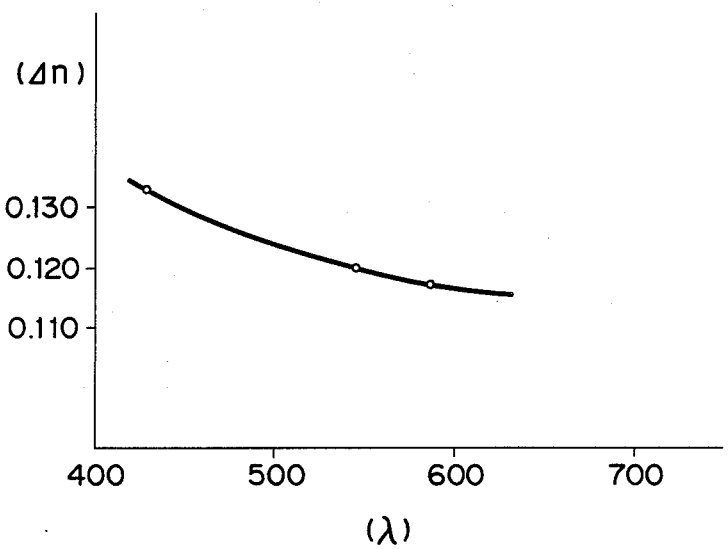
FIG. 6 is a graph illustrating the wavelength-dependency of the optical anisotropy for a liquid crystal used in this invention.
Figure 7:
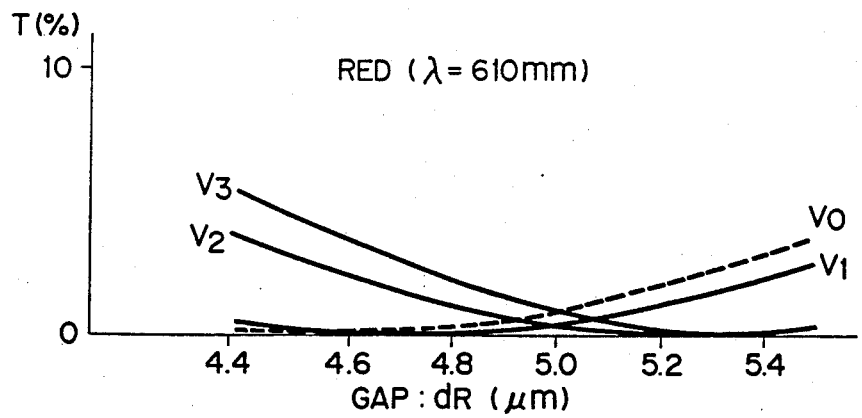
FIG. 7 is a graph illustrating the transmissivity with respect to a liquid crystal layer thickness $d_R$ for red light for different voltages applied between facing electrodes.
Figure 8:
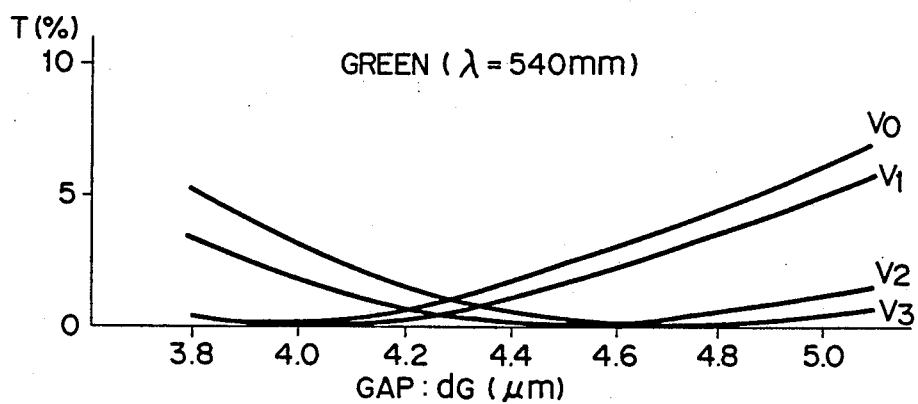
FIG. 8 is a graph illustrating the transmissivity with respect to a liquid crystal layer thickness $d_G$ for green light for different voltages applied between facing electrodes.
Figure 9:
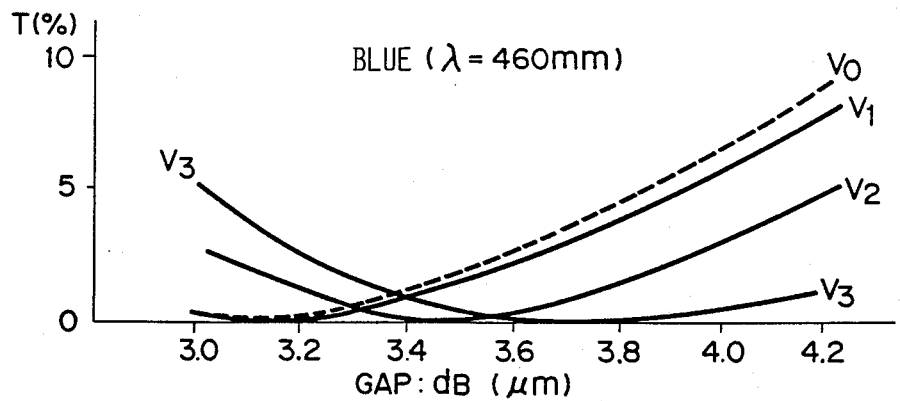
FIG. 9 is a graph illustrating the transmissivity with respect to a liquid crystal layer thickness $d_B$ for blue light for different voltages applied between facing electrodes.

FIGS. 7 through 9 illustrate a change in transmissivity with respect to the thickness (gap) of the liquid crystal layer when a liquid crystal having the wavelength-dependency of optical anisotropy $\Delta n$ as shown in FIG. 6 is used and a voltage V0, i.e., zero voltage applied (no electric field) and sequentially increasing voltages V1–V3 are applied between facing electrodes. FIG. 7 indicates the relationship between the gap ($\mu m$) and the transmissivity with respect to red ($\lambda = 610$ nm) light, while FIGS. 8 and 9 indicate the same relationship for green ($\lambda = 540$ nm) light and blue ($\lambda = 460$ nm) light, respectively. In these figures, V1(OFF), V2(OFF) and V3(OFF) are voltages for controlling the pixels in light shielding status (OFF) and correspond to the bias voltage.

As illustrated in FIG. 7, with respect to red light, the transmissivity T is minimum for gap $d_R$ being about 4.6 $\mu m$ in no electric field state and gap $d_R$ indicating this minimum value increases with an increase in the voltage applied between facing electrodes. As shown in FIG. 8, with respect to green light, the transmissivity T is minimum with gap $d_G$ being about 3.9 $\mu m$ in the no electric field state and gap $d_G$ indicating this minimum value increases with an increase in the voltage. Similarly, with respect to blue light, as shown in FIG. 9, the transmissivity T is minimum with gap $d_B$ being about 3.1 $\mu m$ in the no electric field state and gap $d_B$ indicating this minimum value increases with an increase in the voltage.

The display device according to the second embodiment is driven in a multiplex manner and those pixels in the OFF state are also applied with the bias voltage. Therefore, to attain nearly perfect dark state by minimizing the light passing through each of the R, G and B filters, gaps $d_R$, $d_G$ and $d_B$ are set to the values which minimize the transmissivities with the bias voltage applied between the associated electrodes. That is, with V3 being the bias voltage in FIGS. 7–9, $d_R$, $d_G$ and $d_B$ are about 5.3 $\mu m$, 4.7 $\mu m$ and 3.7 $\mu m$ respectively.

FIGS. 10–13 illustrate the spectrum transmissivity characteristics in the ON and OFF states with gaps $d_R$, $d_G$ and $d_B$ set in the above manner. In FIGS. 10 and 11, gaps $d_R$, $d_G$ and $d_B$ are 4.7 $\mu m$, 4.2 $\mu m$ and 3.8 $\mu m$, respectively and the applied voltage in the OFF state is 2.9 V. In FIGS. 12 and 13, $d_R$, $d_G$ and $d_B$ are 5.3 $\mu m$, 4.7 $\mu m$ and 4.0 $\mu m$, respectively and the applied voltage in the OFF state is 3.1 V. As shown in FIGS. 11 and 13, the spectrum transmissivity curve R for the pixels with gap $d_R$ corresponding to the red filter is minimum at the proximity of wavelength $\lambda = 600$ nm, the spectrum transmissivity curve G for the pixels with gap $d_G$ corresponding to the green filter is minimum at the proximity of wavelength $\lambda = 540$ nm, and the spectrum transmissivity curve B for the pixels with gap $d_B$ corresponding to the blue filter is minimum at the proximity of wavelength $\lambda = 450$ nm. It should be noted from the spectrum characteristic diagrams that the display device of this embodiment provides a nearly perfect dark state when the bias voltage is applied thereto and has a high color balance.

Figure 14:
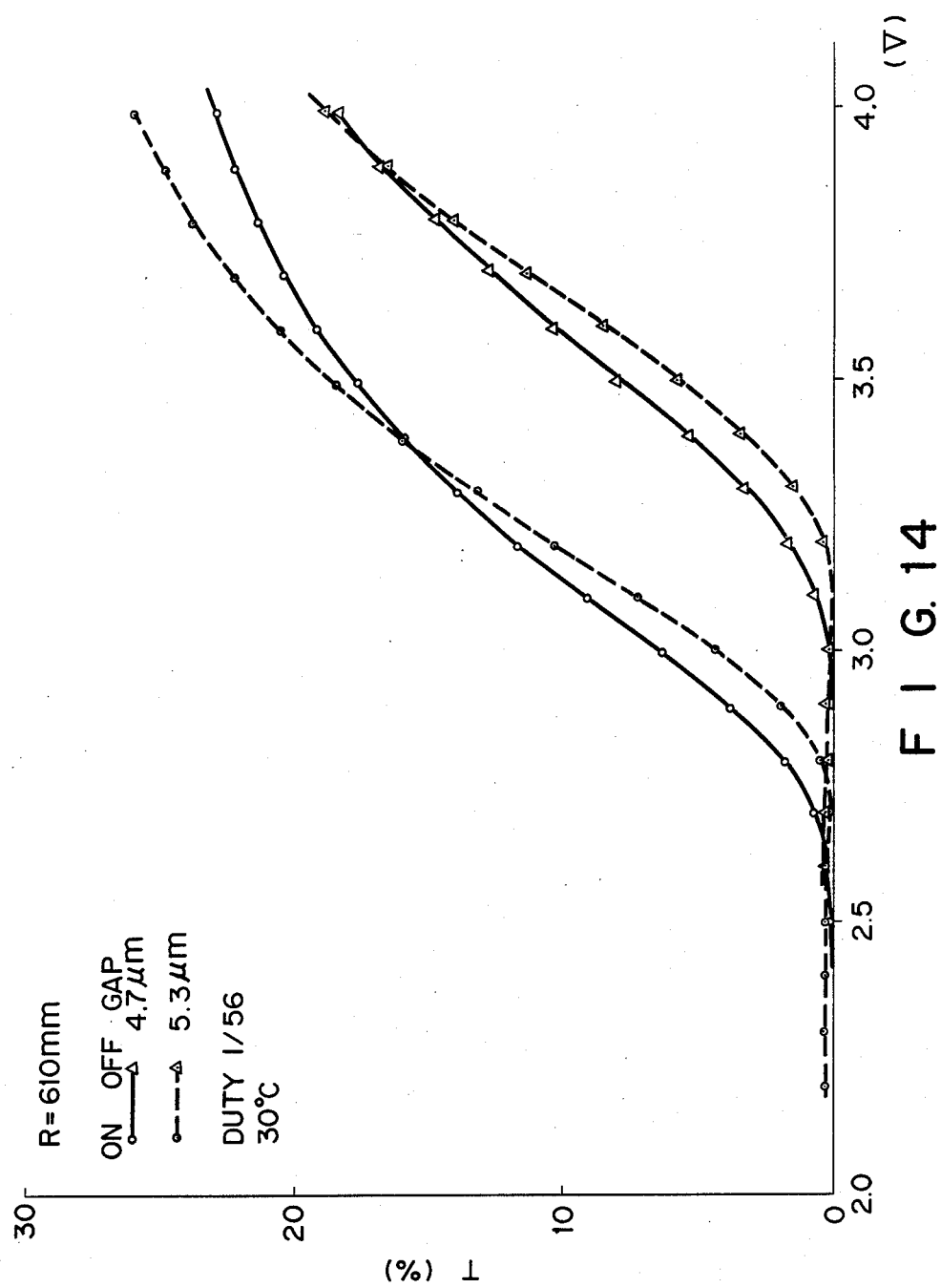
FIGS. 14 through 16 are diagrams of the operational characteristics according to the second embodiment, illustrating the transmissivities with respect to an applied voltage for red, green and blue lights, respectively.
Figure 15:
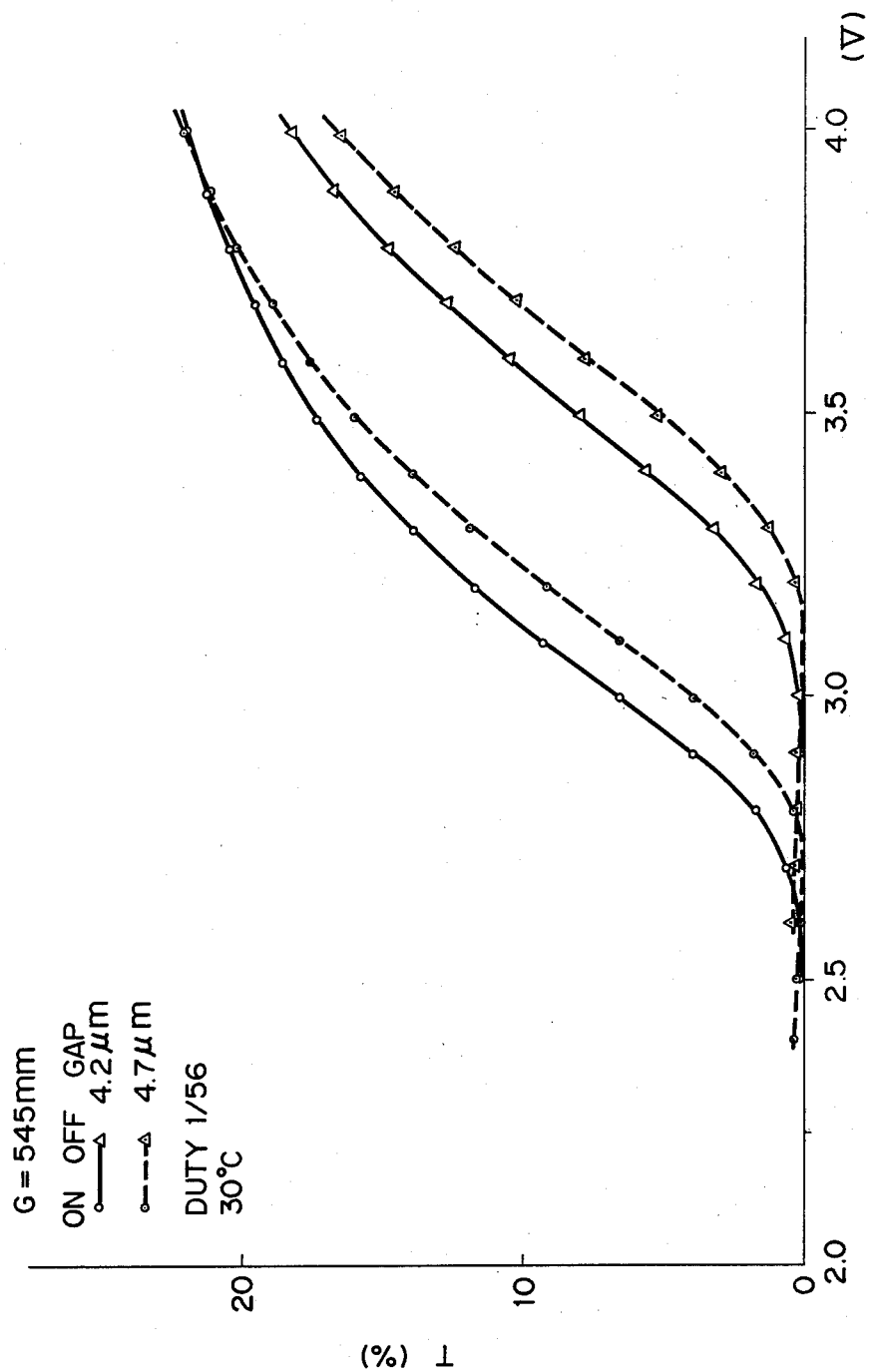
Figure 16:
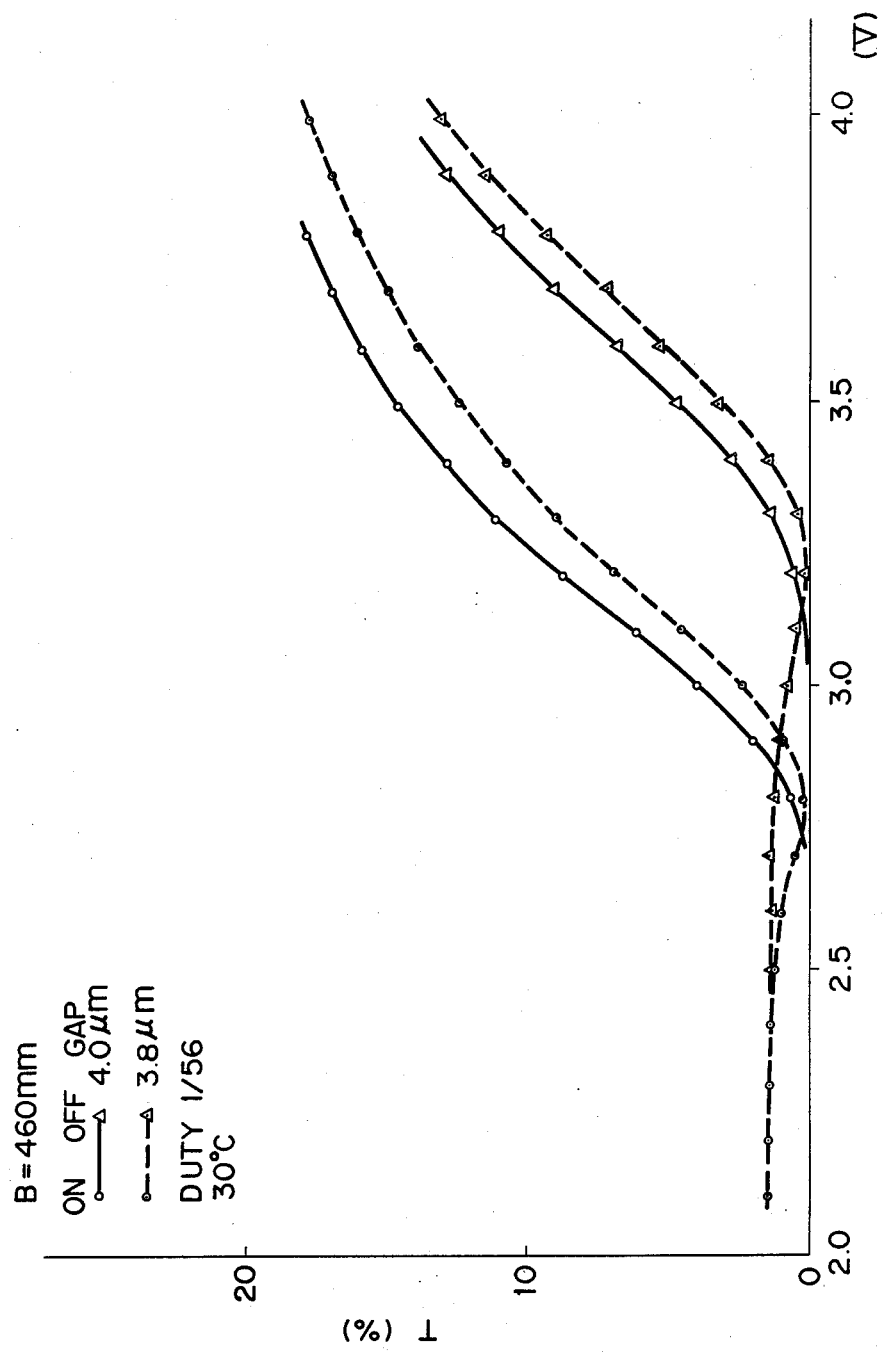

FIG. 14 illustrates the transmissivity characteristic with respect to the applied voltage with $d_R$ for red ($\lambda = 610$ nm) light being set to 4.7 $\mu m$ and 5.3 $\mu m$. FIG. 15 illustrates the transmissivity characteristic with respect to the applied voltage with $d_G$ for green ($\lambda = 545$ nm) light being set to 4.2 $\mu m$ and 4.7 $\mu m$. FIG. 16 illustrates the transmissivity characteristic with respect to the applied voltage with $d_B$ for blue ($\lambda = 460$ nm) light being set to 3.8 $\mu m$ and 4.0 $\mu m$. The driving signal has a 1/56 duty and the device temperature is 30 C. As shown in FIGS. 14–16, when $d_R = 4.7$ $\mu m$, $d_G = 4.2$ $\mu m$ and $d_B = 3.8$ $\mu m$ and $d_R = 5.3$ $\mu m$, $d_G = 4.2$ $\mu m$ and $d_B = 4.0$ $\mu m$, nearly complete dark state can be attained at V = 2.9 V and V = 3.1 V, respectively. As the former case has a low contrast ratio and the latter case has a high contrast ratio, the latter is desirable for the color liquid crystal display device.

Further, when $d_R$, $d_G$ and $d_B$ are respectively set to 5.8 $\mu m$, 4.2 $\mu m$ and 4.8 $\mu m$, the same effect as has been attained in the above embodiment can also produced. In this case, a considerably high contrast ratio of 22.4 is attained.

According to the above-described second embodiment, when the product of the optical anisotropy $\Delta n$ of the liquid crystal and gap d, $\Delta n \cdot d$, is below 0.4, the visual characteristic is poor and when it is above 0.9, the gap needs to be increased, thus weakening the intensity of the electric field applied to the liquid crystal and reducing the response speed. According to this embodiment, therefore, it is desirable that $\Delta n \cdot d$ ranges between 0.45 and 0.8.

FIG. 17 illustrates a modification of the second embodiment and uses the same reference numerals for the elements corresponding to those in the second embodiment, thus omitting their explanation. As shown in FIG. 17, a color filter 217 has individual color filters 217B, 217G and 217R arranged side by side without seam. In this modification, the same effect as attained in the second embodiment can be produced by varying the thicknesses of the individual filters 217B, 217G and 217R and setting the thicknesses $d_R$, $d_G$ and $d_B$ of the liquid crystal layer in the same manner as is done in the second embodiment.

What is claimed is:

1. A color liquid crystal display device for displaying an image, comprising:
    first and second substrates facing each other;
    a color filter comprised of three types of filters associated with primary colors of red, green and blue, formed on that surface of said first substrate which faces said second substrate, so that different color filters are arranged in a predetermined order;
    a first insulative film formed over said color filter and made of a substantially transparent organic material;
    a second insulative film formed over said first insulative film and made of a substantially transparent inorganic material;
    a plurality of first electrodes formed on said second insulative film in association with the three types of filters that comprise said color filter, and made of a substantially transparent conductive material;
    a plurality of second electrodes formed on that surface of said second substrate which faces said first substrate in such a manner as to face at least one of said first electrodes and made of a conductive material;
    a first aligning film formed over said first electrodes and said second insulative film, for arranging liquid crystal molecules adjacent to the surface of the second insulative film in a predetermined direction;
    a second aligning film formed over said second electrodes and said second substrate, for arranging liquid crystal molecules adjacent to the surface of the second substrate which faces the first substrate in a predetermined direction;
    liquid crystal disposed between said first and said second aligning films so that molecules of the liquid crystal are twisted substantially by 90 degrees between the first and the second aligning films; and
    a pair of polarizing means provided on both sides of an exterior of said liquid crystal and arranged so that polarizing axes of the polarizing means are parallel to one another;
    wherein a number of small regions between the first and the second electrodes form a number of pixels which are normally set in a light shielded state, and the light transmission state of the pixels can be controlled to display a desired image.

2. The display device according to claim 1, wherein said first insulative film is film of a synthetic resin made of an organic high molecular material.

3. The display device according to claim 2, wherein said synthetic resin is a polyimide-base resin.

4. The display device according to claim 2, wherein said synthetic resin is a acrylic-base epoxy resin.

5. The display device according to claim 1, wherein said second insulative film is a film of an inorganic oxide.

6. The display device according to claim 5, wherein said oxide is a silicon dioxide.

7. The display device according to claim 1, wherein said first insulative film is a film of an acrylic-base synthetic resin; and
    said second insulative film is a $SiO_2$ film.

8. The display device according to claim 1, wherein said color filter is a film of colored protein;
    said first insulative film is a film of a synthetic resin made of an organic high molecular material; and
    said second insulative film is a film of an inorganic oxide.

9. The display device according to claim 1, wherein said color filter is a film of colored casein;
    said first insulative film is a film of an acrylic-base epoxy resin;
    said second insulative film is a $SiO_2$ film; and
    said first electrode is an Indium-Tin-Oxide film.

10. The display device according to claim 1,
    wherein said plurality of second electrodes are arranged so as to intersect said first electrodes and one of said second electrodes intersects at least two of said first electrodes, and one of said first electrodes intersects at least two of said second electrodes.

11. The display device according to claim 10, wherein said first electrodes are signal electrodes arranged in stripe; and
    said second electrodes are scanning electrodes arranged in stripe.

12. The display device according to claim 1, wherein said liquid crystal has different thicknesses at those portions which correspond to said three types of filters forming said color filter.

13. The display device according to claim 1,
    wherein said plurality of second electrodes are arranged so as to form a plurality of pixels at those portions which intersect a plurality of said first electrodes; and
    said liquid crystal has different thicknesses at those portions thereof which correspond to said three types of filters of said color filter, said thicknesses being set to minimize transmissivity when a signal for setting a pixel at a cross point of mutually-facing first and second electrodes in a dark state is applied between said mutually-facing first and second electrodes.

14. The display device according to claim 13, wherein said color filter has different thicknesses for associated filters of red, green and blue; and
    said thicknesses of said liquid crystal are determined by thicknesses of said associated filters.

15. The display device according to claim 13, wherein an optical anisotropy $\Delta n$ and layer thickness of said liquid crystal are set such that $\Delta n \cdot d$ ranges between 0.45 and 0.8.

16. The display device according to claim 13, wherein said first and said second aligning films are subjected to an aligning treatment in mutually-perpendicular directions, respectively, for providing a twisted alignment of said liquid crystal.

17. The display device according to claim 13, wherein said thicknesses of liquid crystal are determined so that a value $\Delta n \cdot d$ obtained by multiplying a refractive index anisotropy $\Delta n$ of the liquid crystal by a thickness d of the liquid crystal is a value necessary to reduce the transmissivity of the pixels to a minimum value, when liquid crystal molecules are excited by a bias voltage of a signal applied to the facing first and second electrodes, for obtaining a dark state of the pixels.

18. The display device according to claim 13, wherein said first and second electrodes are applied with a signal for driving said display device in a multiplex manner and a scanning signal.

19. The display device according to claim 1, wherein said three types of filters that comprise said color filter are repeatedly arranged in stripe in a predetermined order for each color;
- a plurality of first electrodes are arranged in stripe in association with said three types of filters of said color filter;
- a plurality of second electrodes are arranged so as to form a plurality of pixels at those portions which intersect a plurality of said first electrodes, and extend in a direction substantially perpendicular to said first electrodes;
- said liquid crystal has different thicknesses at those portions thereof which correspond to said three types of filters of said color filter, said thicknesses being set to minimize transmissivity when a signal for setting a pixel at a cross point of mutually-facing said first and second electrodes in a dark state is applied between said mutually-facing first and second electrodes.

20. A color liquid crystal display device for displaying an image, comprising:
- first and second substrates facing each other;
- a color filter including a plurality of filters of different colors formed on that surface of said first substrate which faces said second substrate;
- a first insulative film formed over said color filter and made of a substantially transparent organic material;
- a second insulative film formed over said first insulative film and made of a substantially transparent inorganic material;
- a plurality of first electrodes formed on said second insulative film and made of a substantially transparent conductive material;
- a plurality of second electrodes formed on that surface of said second substrate which faces said first substrate in such a manner as to face at least one of said first electrodes and made of a conductive material;
- a first aligning film formed over said first electrodes and said second insulative film, for arranging liquid crystal molecules adjacent to the surface of the second insulative film in a predetermined direction;
- a second aligning film formed over said second electrodes and said second substrate, for arranging liquid crystal molecules adjacent to the surface of the second substrate which faces the first substrate in a predetermined direction;
- liquid crystal arranged between said first and said second aligning films, so that molecules of the liquid crystal are twisted substantially from those molecules adjacent the first aligning film to those adjacent the second aligning film, the thicknesses of portions of the liquid crystal which correspond to the color filters of different colors being determined such that a value obtained by multiplying a refractive index anisotropy $\Delta n$ of the liquid crystal by a thickness d of the liquid crystal, in a state wherein the liquid crystal molecules are excited by a bias voltage of a signal applied to facing first and second electrodes, is determined so as to reduce the transmissivity of the pixels to a minimum value for obtaining a dark state of the pixels; and
- a pair of polarizing means provided on both sides of an exterior of said liquid crystal;
- wherein an amount of light transmitted through the pixels can be controlled to display a desired color image.

* * * * *